CHARLES F. PIERSON
JOHN W. BENJAMIN
EDWARD T. HOLLAND, JR.
INVENTORS

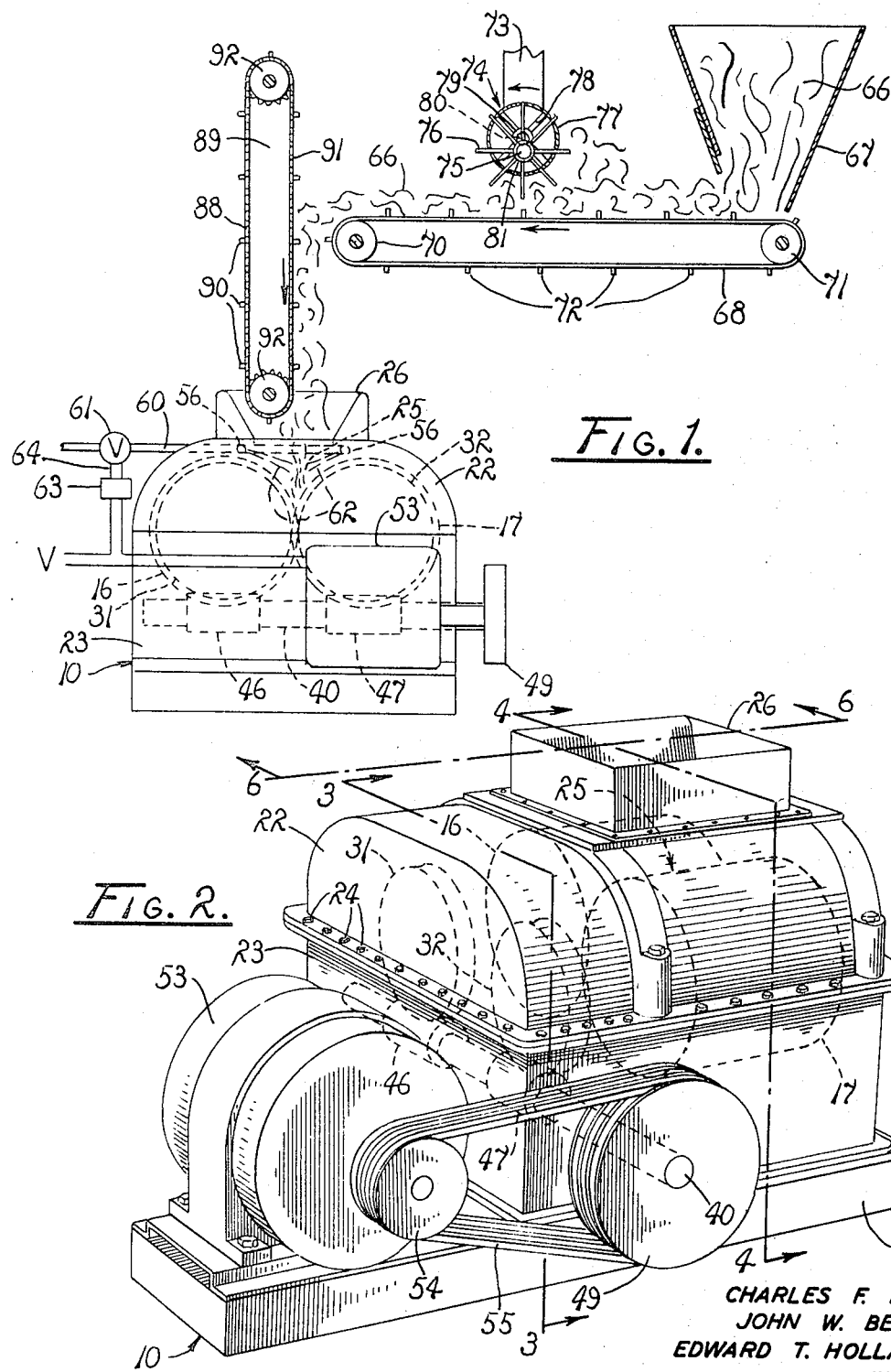

HUEBNER & WORREL
BY
ATTORNEYS

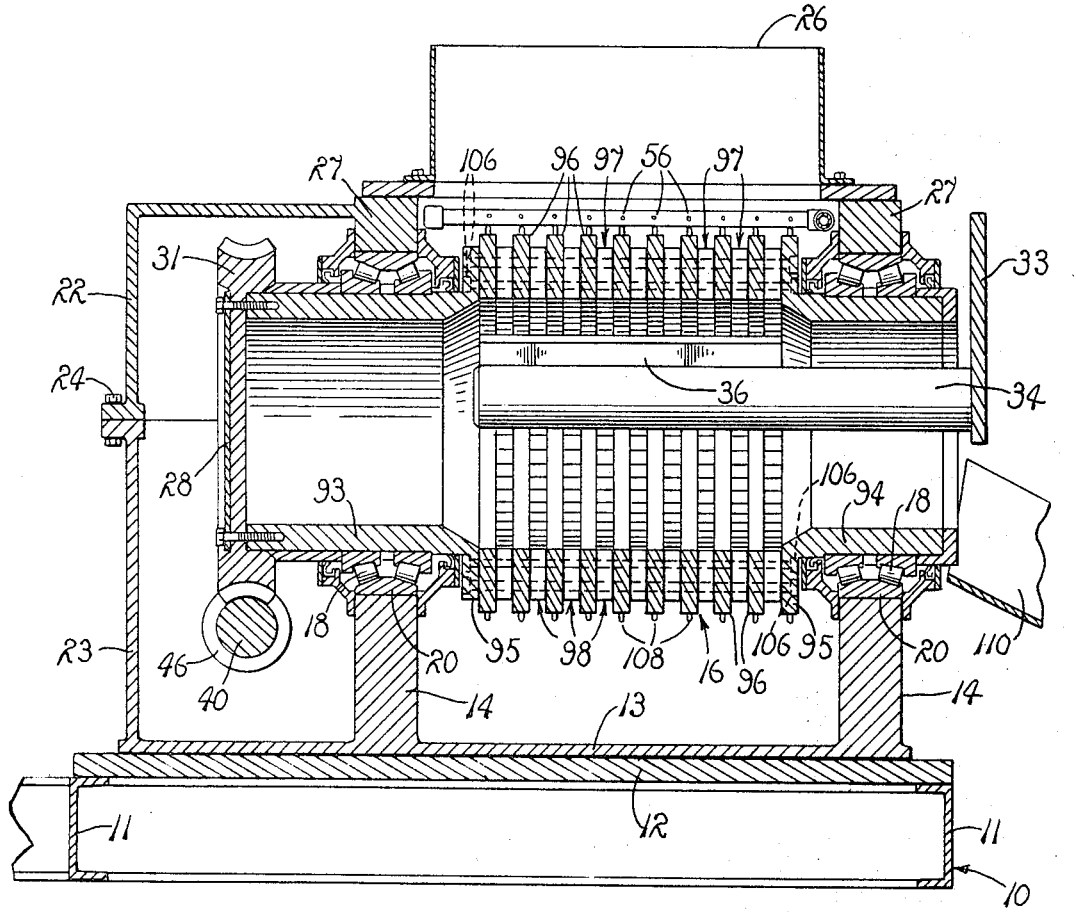

United States Patent Office 3,452,393
Patented July 1, 1969

3,452,393
APPARATUS FOR FORMING PELLETS
Charles F. Pierson, Long Lake, Minn., and John W. Benjamin and Edward T. Holland, Jr., Lancaster, Pa., assignors to Farmhand, Inc., a corporation of Delaware
Filed Dec. 29, 1965, Ser. No. 517,234
Int. Cl. B29f 3/01
U.S. Cl. 18—12                                    5 Claims

ABSTRACT OF THE DISCLOSURE

An apparatus for forming pellets providing a pair of coacting hollow dies mounted for rotation about substantially parallel axes and having circumscribing shear rings defining channels therebetween with the rings of each die extending into the channels of the other die and with the adjacent rings in shearing relation, each die providing extrusion passages extended inwardly from its channels and including drive means connected to the dies for rotating them in opposite directions whereby the dies have adjacent peripheries traveled in the same direction, and means for metering material to be pelleted between the dies.

---

Although the apparatus of the present invention is excellently suited to the pelleting of a wide variety of materials, including sheet, solid, comminuted and powdered materials, its utility is conveniently illustrated by reference to the pelleting of paper, cardboard, and other fibrous sheet materials.

In the containerization and packaging industry, large quantities of scrap cardboard and paper are generated and these materials constitute a voluminous waste, only a small portion thereof being recoverable. Some of the scrap is baled and shipped to reprocessing plants, but obvious disadvantages are present in this operation.

One disadvantage lies in the bulkiness of the bales which renders them costly to handle in terms of manpower, and expensive to ship because freight charges are based in part on volumetric requirements. Also, the bulkiness requires a large capital investment in space facilities and in processing and storage equipment. In addition, the process of baling produces dust which reduces the life of equipment and requires expensive removal systems for the sake of personnel health and plant safety. It is also difficult to maintain an area for marshalling scrap in a tidy condition, and the scrap in these areas in unsightly, subject to wind scattering, and constitutes a fire hazard.

Conventional pelleters are sometimes used for converting scrap paper, cardboard and the like into pellets in order to obviate the above problems but they require a preconditioning step such as grinding which is costly and disintegrates a significant percentage of the fibers. This detracts from the final quality of the reconstituted material. Further, the preliminary grinding which, of course, requires extensive power, actually reduces the density of the material so as to precondition it for subsequent compaction into increased density, an obviously anomalous, wasteful and self-defeating step but one which has heretofore been regarded as unavoidable in paper pelleting procedures. Moreover, conventional pelleters are bulky, expensive to construct and repair, and their use in pelleting scrap paper is accompanied by the production of fines which require extensive filtering systems to protect personnel and equipment. Furthermore, conventional pelleters are inefficient because of the low ratio of die orifice to die area, and in operation so much heat is generated, a measure of their wasted energy, that extensive cooling systems must be employed. These and other difficulties have greatly hindered the progress of converting scrap paper and cardboard into pellets and the attainment of the obviously significant handling and storing advantages thereof.

With the foregoing in mind, it is an object of the present invention to provide a new and improved apparatus for forming pellets from a wide variety of materials.

Another object is to provide an apparatus for converting a wide variety of materials into high density pellets and which have particularly advantageous application to the pelleting of paper, cardboard and other cellular materials.

Another object is to provide an apparatus for forming pellets which obviates previous requirements for preliminary grinding or comminuting.

Another object is to provide an apparatus for producing pellets from scrap cardboard, paper and the like without requiring high capacity cooling systems.

Another object is to provide an apparatus for producing pellets from a wide range of materials with a minimum production of fines.

Another object is to provide an apparatus for forming pellets which have lower power requirements than previous methods and apparatus for the purpose.

Another object is to provide a more compact apparatus for forming pellets than previous such apparatus of comparable capacity enabling the use of smaller and neater space facilities for the marshalling area and pellet discharge and handling area.

These and other objects of the invention will become more clearly apparent upon reference to the subsequent description and accompanying drawings.

In the drawings:

FIG. 1 is a schematic representation of an apparatus for forming pellets embodying the principles of the present invention shown in association with a suitable feed system.

FIG. 2 is a perspective of the apparatus of FIG. 1

FIG. 6 is a longitudinal vertical section of the apparatus taken on line 6—6 of FIG. 2.

FIG. 7 is an enlarged, fragmentary, exploded, perspective of characteristic die teeth, shear plates and mounting rods employed in the dies of the present invention.

Figure 3:
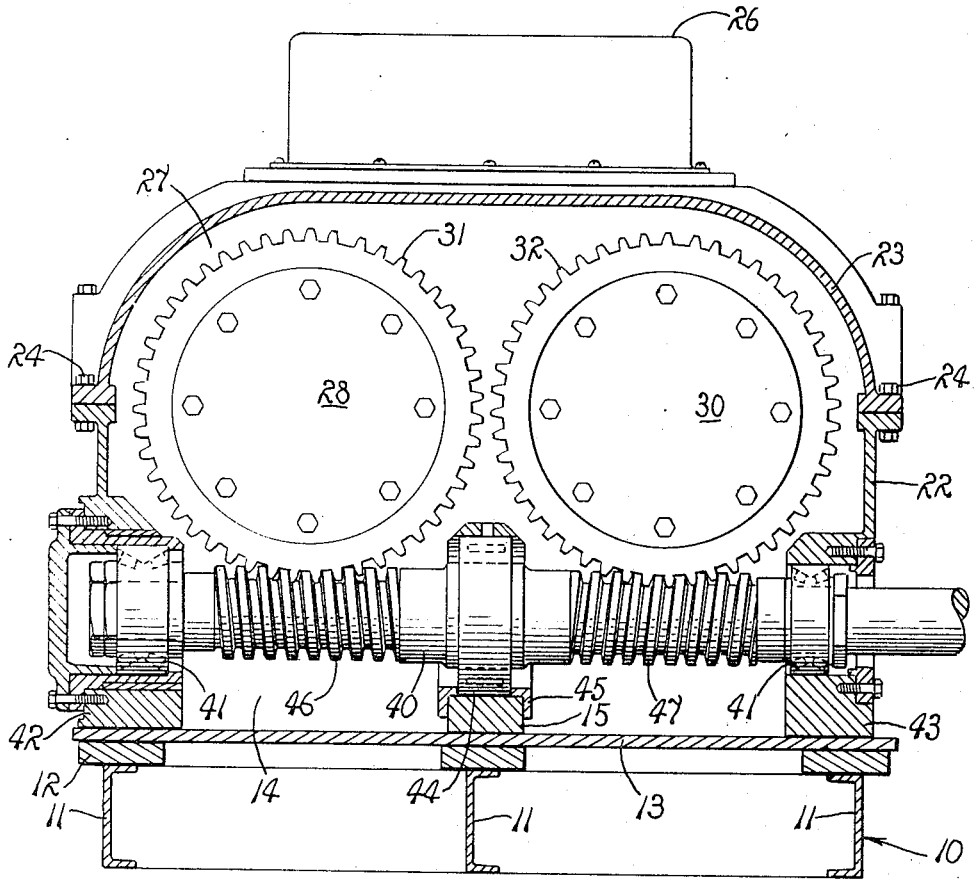
FIG. 3 is a section of the apparatus taken on a vertical plane represented by line 3—3 of FIG. 2.

Referring in greater detail to the drawings, a support frame 10 is provided having a plurality of substantially parallel beams 11, plates 12 mounted on the beams, and a base or deck 13 supported by the plates. The beams, plates and base are welded or otherwise secured in rigid assembly. Vertically upright supports 14 and 15 are rigidly mounted on the base.

As best shown in FIGS. 2, 3, 4, 6 and 8, a pair of hollow, counter-rotating dies 16 and 17 have opposite ends journaled in thrust bearings 18 mounted in journal boxes, 20, and the boxes, bearing the weights of the dies, are mounted on the upright supports 14. The dies are enclosed by upper and lower housing members 22 and 23 of any suitable form fastened together along adjacent edges by a plurality of bolts 24. The dies coact along an interengagement area 25, the details of which will be subsequently described. A feed hopper 26 is positioned in the upper housing member over and enclosing the inter-engagement area and is mounted on supports 27 upstanding from each journal box 20. Plates 28 and 30 seal one end of each die 16 and 17, respectively, and annular die gears 31 and 32 are mounted at the sealed ends of the dies, as shown in FIGS. 2 and 3. A breaker bar plate 33 is mounted in the housing member 22 across the opening of each die opposite to the plates 28 and 30. The breaker bar plate carries rigid cantilever holders 34 and 35 individual to the dies within, and axially parallel to, their respective dies. Stationary breaker bars 36 and 37 are mounted on the holders and are positioned parallel and in close proximity to the inside surfaces of the dies.

A worm gear shaft 40 is journaled within thrust bearings 41 mounted within journal boxes 42 and 43 and the boxes are mounted on the base 13. The middle of the shaft is journaled within roller bearings 44 revolving within a journal box 45. The journal box is mounted on supports 15. The worm gear shaft is provided with reverse helices 46 and 47 which engage the die gears 31 and 32, respectively, and rotation of the worm gear shaft provides opposite rotational movement for the dies through the reverse helices. The worm gear shaft has a drive end which carries a multiple driven pulley 49. The dies are powered by an electric motor 53 or any other suitable source of power mounted on the base 13 and the electric motor provides a multiple drive pulley 54. A plurality of V-belts 55 connect the drive pulley 54 to the driven pulley 49 and thereby power the worm gear shaft, the differences in the diameters of the pulleys acting act a speed reduction system for the electric motor.

Figure 4:
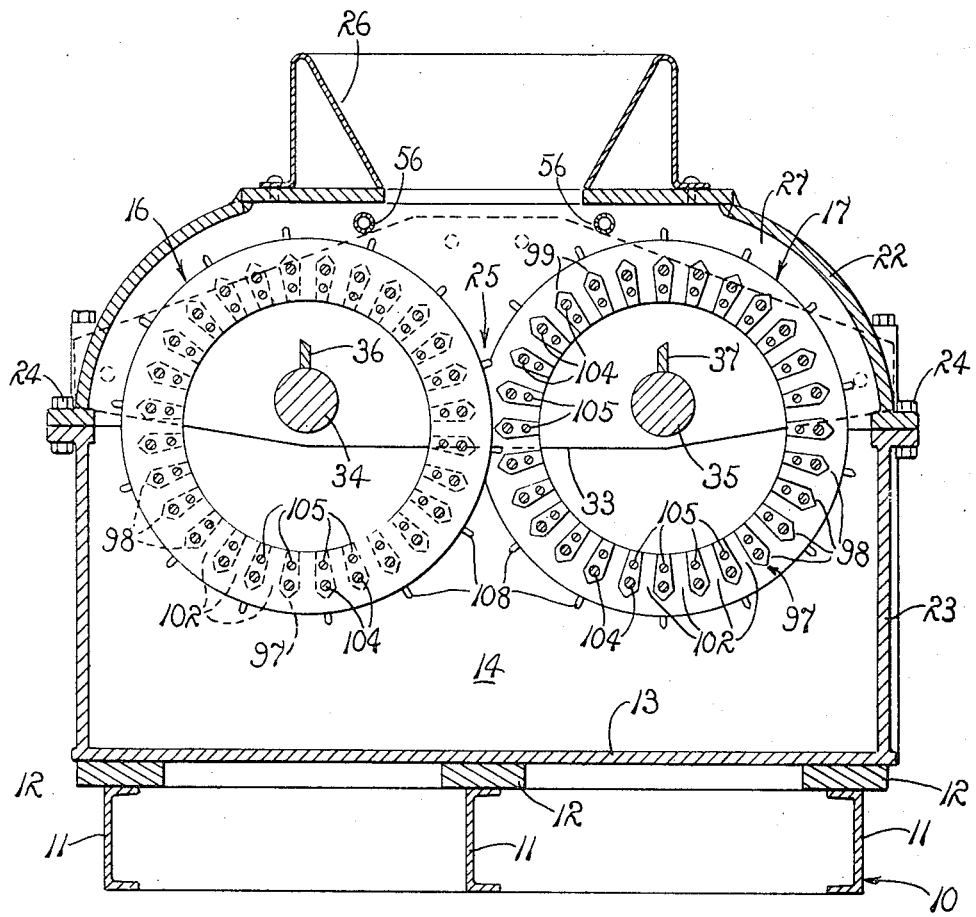
FIG. 4 is a section of the apparatus taken on a vertical plane represented by line 4—4 of FIG. 2.

Positioned over the inter-engagement area 25 are spray nozzles 56 connected to a water supply conduit 60 through a conventional solenoid control valve 61, as shown in FIGS. 1 and 4. Water is supplied through the conduit to the nozzles and is applied over the dies 16 and 17 as a water spray 62. The motor 53 is provided with an amperage sensor 63 which is connected to the solenoid control valve 61 through an electric circuit 64 and the valve is regulated by current modulated by the amperage sensor to control the amount of water sprayed over the dies. It is known that the cellulose fibers in paper and the like contain cellular moisture even when the paper appears dry. However, this moisture varies considerably. For reasons which will subsequently become apparent, the friction of operation of the dies 16 and 17 appreciably increases as the paper becomes drier, increasing the load on the motor 53, and decreases due to improved lubricity as the paper becomes more moist, decreasing the load on the motor. Thus, by detection of motor load variation, the sensor 63 through valve 61 correspondingly increases or decreases the spray 62 supplied by the nozzles 56 to maintain sufficient lubricity for efficient pelleting. Of course, if the cellulose fibers, or other material being used, contains sufficient moisture, no additional spray is required. An incidental advantage is that the spray 62 minimizes air-borne dust and the contamination of the adjacent atmosphere as well as loss of the material being pelleted by air-borne escape. However, the described apparatus is much less prone to create dust even without the spray than the previous pelleting devices.

A metering arrangement shown in FIG. 1 is provided for supplying a controlled amount of scrap 66 to the extrusion dies 16 and 17. This includes a garner box or hopper 67 for receiving scrap paper, cardboard and the like to be pelleted. A substantially horizontal conveyor belt 68 is positioned below the hopper on rollers 70 and 71 and driven in the direction shown by the arrow to provide an upper run traveled toward the hopper 26. A series of transverse flight bars 72 are mounted at intervals along the conveyor belt.

A support frame 73 is provided over the conveyor belt 68 and a metering wheel 74 rotatably mounted on an axle 75 in the frame. The axle and wheel are positioned transversely to the conveyor belt and the wheel is driven by any suitable means, not shown, so that its periphery adjacent to the upper run of the belt travels in the opposite direction to said upper run. The wheel is provided with a plurality of spokes 76 slidably extended through an eccentrically mounted rim 77. The rim is mounted by auxiliary spokes 78 projecting from a hub 79 journaled on a shaft 80. The spokes 76 extend radially from a hub 81 journaled on the axle 75 eccentric and below the shaft 80. As will be apparent to those skilled in the art, the shafts 80 and 75 actually may be a single crank shaft to achieve the desired eccentricity. As the hubs 79 and 81 are rotated, the rim 77 and spokes 76 correspondingly rotate with the spokes increasingly projecting outwardly of the rim as they move toward the belt 68 and withdrawing into the rim as they move upwardly from the belt.

Positioned at the end of travel of the conveyor belt 68 and spaced therefrom is a pair of vertically travelling, parallel, endless chains 88 mounted in peripheral guide channels of plates 89 in the well-known manner of chain saws. Parallel flight bars 90 interconnect the chains in parallel spaced relation. The chains and flight bars provide a vertical descending run 91 adjacent to the belt 68 and the chains are driven by sprockets 92 in mesh with their respective chains so that the run 97 moves downwardly toward the hopper 26.

The construction of the dies 16 and 17 and their relationship to each other is a significant feature of the present invention. As shown in FIGS. 4 through 7, each die includes end elements 93 and 94 rotatably mounted in the thrust bearings 18. Each of the end elements has a radial flange 95. Sandwiched between the flanges are substantially identical, alternate, annular impactor shear rings 96 and annular sets 97 of teeth 98. The rings and teeth are of substantially the same thickness, measured axially of their respective dies 16 and 17. The rings are of substantially the same radius which is in excess of the spacing of their respective axes of rotation so that they peripherally overlap, as best seen in FIGS. 3, 4, 5 and 8. Since the teeth are substantially the same thickness as the rings, the rings interfit in an effective shearing relationship.

Figure 5:
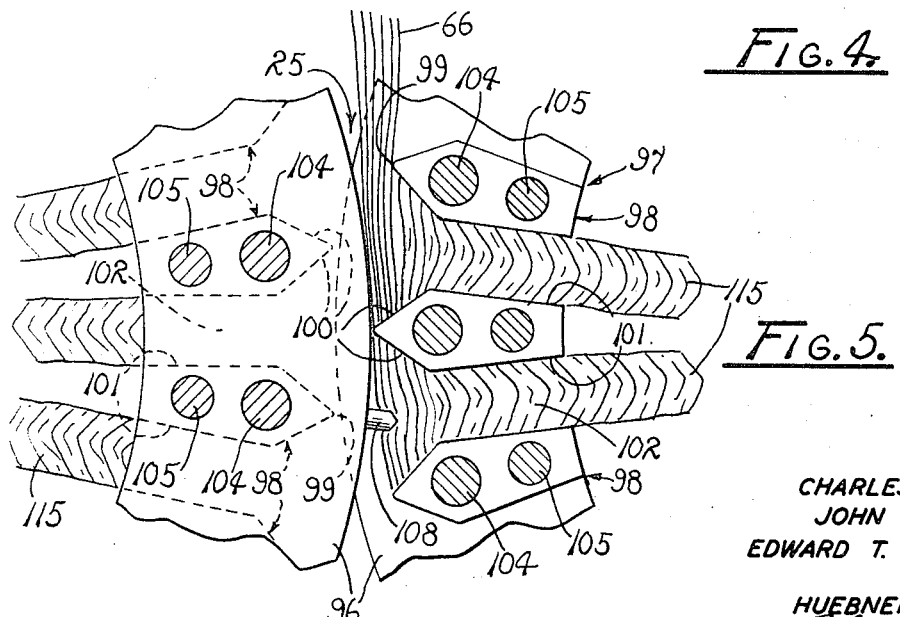
FIG. 5 is a fragmentary enlarged transverse section of dies utilized in the apparatus of the present invention.
Figure 8:
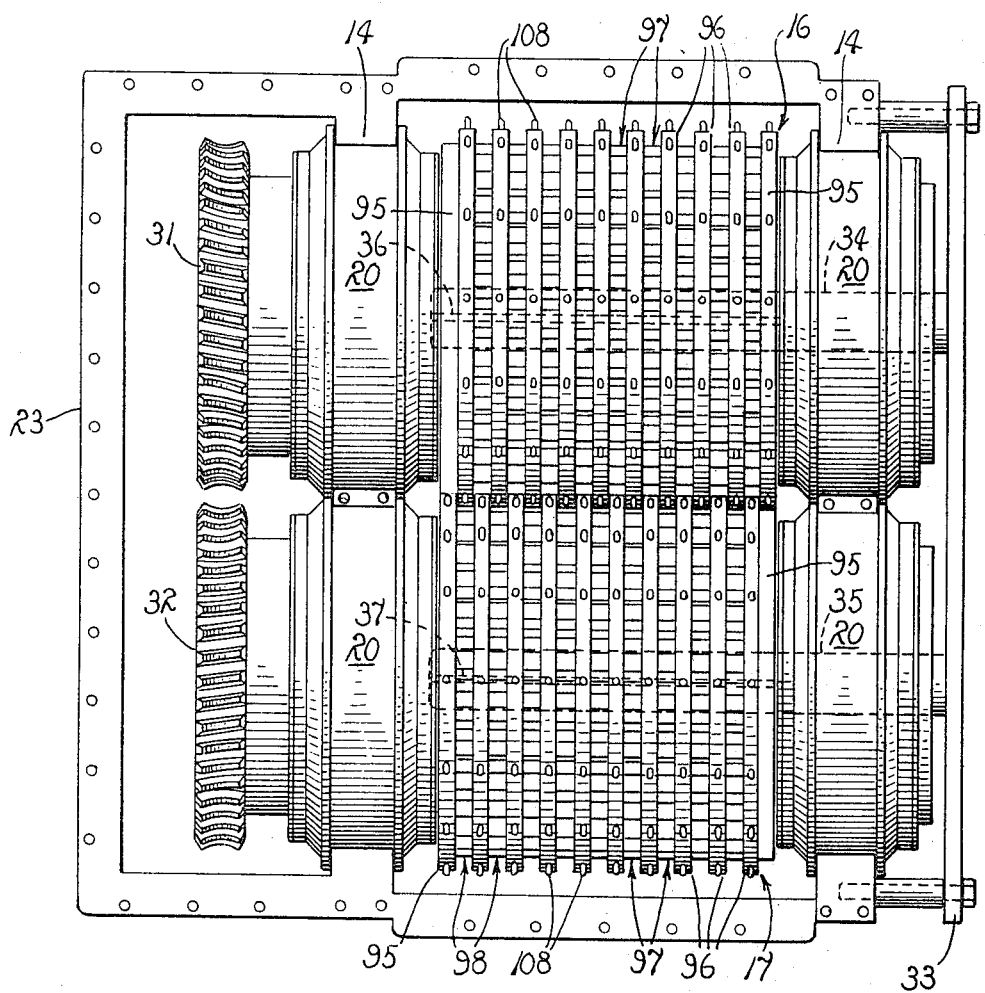
FIG. 8 is a plan view of the dies and their mounting structure.

The teeth 98 are conveniently identical and provide outer sharpened edges 99, inwardly divergent outer faces 100 and inwardly convergent inner faces 101. The teeth of each set 97 are mounted in substantially equally spaced relation in an annular arrangement concentric to the rings of their respective die 16 or 17. Such arrangement is of such radius that the edges 99 are disposed in a circle substantially tangential to the ring aligned therewith, as best shown in FIG. 5. With the teeth so disposed, the inner ends of the adjacent faces 101 of adjacent teeth, in association with their axially adjacent rings, define inwardly constricted passages 102 which are of rectangular cross section and at their inner ends or orifices are of substantially square cross section, for reasons which will subsequently become apparent.

The teeth 98 and rings 96 are held in assembled relation and under axial compression by a pair of rods 104 and 105 extended in parallel relation through corresponding teeth 98 and their respective rings. Opposite ends of the rods are provided with nuts 106 screw-threaded thereon and tightened against the axially outermost rings.

The dies 16 and 17 are mounted for rotation about axes disposed in a common plane and spaced so that the peripheries of the rings 96 of each die fit between the rings of the adjacent die. The outer edges of the teeth 98 of each set 97 are disposed on a circle concentric to the rings 96 of their respective die and substantially tangential to the ring aligned therewith of the opposite die. Expressed differently, the outer edges of the teeth are on a circle having a radius less than the radius of the rings an amount substantially equal to, but slightly less than, the distance of extension of the peripheries of the rings into the channels between the rings.

As shown, the adjacent faces 100 and 101 of adjacent teeth 98 radially inwardly converge from the channels between the rings 96. For pelleting paper and cardboard, the adjacent faces 101 converge approximately 13°. Increased convergence or increased passage length increases resistance to extrusion and results in increased pellet density.

When desired to facilitate feeding, fingers or spikes 108 may be radially extended from the peripheries of the rings 96, as shown in FIG. 7, but must be located so as to miss the outer ends of the adjacent teeth 98.

OPERATION

The operation of the described embodiment of the subject invention is believed to be readily apparent and is briefly summarized at this point. Referring to FIG. 1, scrap paper, cardboard boxes or the like 66 are deposited by hand or otherwise in the garner box 67 from which they descend onto the upper run of the conveyor belt 68 which transports such material toward the left, as viewed. Such material is bulky and extremely prone to jam. In fact, if such material is deposited directly into the hopper 26, jamming almost inevitably results. To meter the material, the wheel 74 is rotated in the direction shown. As the spokes 76 move downwardly, they project outwardly from the rim 77, engage the material to be pelleted, and move any excess material being borne by the belt in a reverse direction. As the spokes move upwardly from the belt, they retract into the rim to discharge any material impaled thereon. Such upward movement tends to tumble any excess material in reserve back of the wheel.

Material 66 carried by the belt 68 and flight bars 72 beneath the wheel 74 is transported to the chains 88 and their descending flight bars 90 which meter the material downwardly into the hopper 26 for descent into the interengagement area 25 between the dies 16 and 17 with their adjacent downwardly moving peripheries. Such downward movement draws the material between the dies 16 and 17. The intermeshing rings 96 slice the material into elongated strips or ribbons and force the ribbons against the teeth 98. The ribbons bridge the passages 102 between the teeth and are cut into segments of predetermined length by the teeth edges 99 coacting with their respective tangentially related ring. Successive longitudinal segments of the ribbon in flat contact are compressed into the channels in a direction aligned with the forces of compression. Such forces are exerted most effectively normal to the ribbons. Continued rotation of the dies eventually fills the channels with compressed material which is finally extruded out of the square orifices of the passages 102 in pulses coincident with the compaction of additional material between the teeth. The extruded material is continuous and either gravitationally breaks off into pellets 115 of random lengths or by contact with the stationary breaker bars 36 and 37. The rotating dies 16 and 17 then tumble the pellets out of their hollow interiors and the pellets are discharged as through chute 110 of FIG. 6.

During the extrusion process, friction develops between the compressed scrap material and the teeth 98 and rings 96 defining the channels. The greater the friction, the greater the power required of the motor 53. When the sensor 63 detects that the load on the motor exceeds a predetermined magnitude, it actuates the valve 61 through the circuit 64 to discharge water through the spray nozzles 56. When the friction between the compressed scrap material and the dies decreases, the load on the motor decreases and the sensor reduces or discontinues the spray. The application of water not only cools the dies but also lubricates the die channels during the extrusion process, reduces any fire hazard that may exist, and minimizes air-borne dust. Various additives may be administered with the water as desired.

The pellets 115 are of square cross section and the corresponding rectangular and square cross sections of the passages 102 are of particular significance in the pelleting of sheet material, such as paper and cardboard. If such material is forced into a passage of circular cross section normal to such sheets, either the material must be cut to fit the passages with consequent unmanageable scraps or edges of square segments, or segments of other geometric shape into which the sheet material can be uniformly divided, must be tucked to fit the circular passages. Such tucking results in excessive accumulation of thickness at the edges of such segments and consequent compaction difficulties. As a result, it has heretofore been regarded as impractical to pelletize such sheet material without preliminary grinding, comminuting or shredding to accommodate circular die orifices, thus reducing the density material in preparation for increasing its density.

Also of significance is the fabricated construction of the dies 16 and 17. The uniformity and standardization of the teeth 98 make it possible to form them by mass production techniques, on standard tooling, economically, and with precision. The substantially identical rings 96 may similarly be economically and accurately produced. The arrangement of the teeth and rings on the rods 104 and 105 is conducive to easy assembly and disassembly.

The pellets 115 have a relatively high density and consequently can be handled easily without requiring excessive storage and transportation capacity. The optimum density of the pellets of paper and the like varies from about 85 to 95 pounds per cubic foot. A higher density results in collapse of the cellular structure of the fibers with a consequent reduction in ultimate strength of the material after it has been reconstituted.

While the description of the present invention has primarily related to the pelleting of scrap paper and cardboard, other materials may be pelleted in a similar fashion. Even pulverulent materials can be pelleted if a sheet material or the like is first utilized to bridge the teeth until sufficient compaction can be achieved in the passages 102 to hold such material. When compressing material which is viscous or otherwise flowable, it is necessary to first provide this matrix base. For example, scrap paper is a suitable matrix for cotton seed, meal, saw dust, alfalfa meal and the like. Scrap paper is first fed into the dies, and once the extrusion operation has commenced, the paper feed is terminated and is followed by the cotton seed meal or other flowable material. It has been found that the compressed paper tends to stabilize the subsequent extrudate of cotton seed pellets and other materials similar in flowability to cotton seed. However, the described apparatus is probably most advantageous in pelleting solid and sheet material directly in solid state without preliminary grinding, such as paper, cardboard, wood planks, straw, bagasse, leaves, fabric and the like.

Although the invention has been herein shown and described in what is conceived to be the most practical and preferred method and apparatus, it is recognized that departures may be made therefrom within the scope of the invention, which is not to be limited to the details disclosed herein but is to be accorded the full scope of the claims so as to embrace any and all equivalent methods and apparatus.

Having described our invention, what we claim as new and desire to secure by Letters Patent is:

1. An apparatus for forming pellets comprising a pair of coacting hollow dies mounted for rotation about substantially parallel axes and individually providing a plurality of substantially identical separate flat annular shear rings of predetermined outer radius, predetermined axial thickness, and cylindrical outer periphery defining channels therebetween with the rings of each die extending into the channels of the other die in shearing relation and each die providing extrusion passages extended radially inwardly from its channels; drive means connected to the dies for rotating them in opposite directions whereby the dies have adjacent peripheries traveled in the same direction; means for metering material to be pelleted between the dies; a plurality of substantially identical teeth disposed between adjacent shear rings in an annular arrangement having an outer radius less than the outer radius of the rings by an amount substantially equal to the distance of extension of the rings into the channels, said teeth being substantially equally spaced in their annular arrangement, being elongated radially of the rings, and each having a thickness axially of the dies substantially equal to the axial thickness of the rings, having sharpened outer edges extended axially of their die between their respective adjacent rings, and adjacent teeth in said annular arrangement having inwardly convergent spaced faces disposed in planes axially of the die and with the adjacent rings defining said extrusion passages of rectangular cross section, each of the teeth having a bore therethrough axially of the die and the rings having bores aligned therewith; rigid tension members extended through the aligned bores compressing said rings and teeth into a rigid assembly; and a plurality of fingers radially outwardly extended from the peripheries of the rings to facilitate feeding of material to be pelleted between the dies.

2. An apparatus for forming pellets comprising a pair of coacting hollow dies mounted for rotation about substantially parallel axes, said dies having circumscribing shear rings defining channels therebetween, the rings of each die extending into the channels of the other die with the adjacent rings in shearing relation, and each die providing extrusion passages extended radially inwardly from its channels; means for metering material to be pelleted between the dies; drive means including an electric motor connected to the dies for rotating the dies in opposite directions whereby the dies having adjacent peripheries traveled in the same direction and having an energizing circuit; an amperage sensor in the energizing circuit to detect load imposed on the motor; spray nozzles mounted adjacent to the dies; means for supplying water under pressure to the nozzles including a control valve; and an electric circuit connected to the valve and including the sensor for regulating the water supply to the nozzles in accordance with the load imposed on the motor.

3. A fabricated apparatus for forming pellets comprising a pair of coacting hollow dies mounted for rotation about substantially parallel axes; and powered drive means for rotating the dies at substantially the same peripheral speed with said dies having adjacent peripheries traveled in the same direction, each of the dies having a plurality of substantially cylindrical shear rings having substantially flat oppositely axially disposed surfaces, said shear rings of each die being disposed in fixed axially spaced concentric relation and in meshed fitted engagement between the shear rings of the opposite die, each of the dies having a plurality of substantially identical teeth between adjacent shear rings disposed in substantially equally peripherally spaced relation in an annular arrangement of a diameter less than that of said adjacent shear rings and substantially concentric thereto, the adjacent teeth between adjacent shear rings having substantially flat parallel spaced faces substantially normal to the faces of said shear rings and defining inwardly constricted passages transversely rectangular throughout their lengths, the corresponding teeth in the annular arrangements thereof in each die being in alignment longitudinally of their respective die, and elongated bolts extended through the shear plates and said aligned teeth of each die in substantially parallel relation to the axis of their respective die and tensioned between the outermost shear plates to hold the intermediate shear plates and teeth under compression, said bolts being releasable and the shear plates and teeth separable to permit individual precision formation, thickness control for fitted intermeshing of the shear plates, and individual repair and replacement.

4. The apparatus of claim 1 in which said fingers are disposed on their respective rings in circumferentially equally spaced relation for instantaneous intermittent alignment with said passages on their respectively opposite rings during rotation of the rings with adjacent fingers encompassing successive pairs of said teeth at said adjacent peripheries of the rings.

5. A fabricated apparatus for forming pellets comprising a pair of coacting hollow dies mounted for rotation about substantially parallel axes; and powered drive means for rotating the dies with said dies having adjacent peripheries traveled in the same direction, each of the dies having a plurality of substantially cylindrical shear rings having substantially flat oppositely axially disposed surfaces, said shear rings of each die being disposed in fixed axially spaced concentric relation and in meshed fitted engagement between the shear rings of the opposite die, each of the dies having a plurality of teeth between adjacent shear rings disposed in substantially equally peripherally spaced relation in an annular arrangement of a diameter less than that of said adjacent shear rings and substantially concentric thereto, the adjacent teeth and their adjacent shear rings defining inwardly constricted passages, and means individual to the dies connected to the outermost shear plates of their respective dies holding the intermediate shear plates and teeth under compression, said means being releasable and the shear plates and teeth separable to permit individual precision formation, thickness control for fitted intermeshing of the shear plates, and individual repair and replacement.

References Cited

UNITED STATES PATENTS

| 1,524,968 | 2/1925 | Des Ylousrs. |
| 1,928,372 | 9/1933 | Elton _____ 25—76 XR |
| 1,977,099 | 10/1934 | Thompson _____ 25—76 |
| 2,186,415 | 1/1940 | Haworth. |
| 3,101,510 | 8/1963 | Packham. |
| 3,324,808 | 6/1967 | Forth _____ 25—76 |

FOREIGN PATENTS

| 320,597 | 4/1920 | Germany. |
| 339,868 | 12/1930 | Great Britain. |

WILLIAM J. STEPHENSON, Primary Examiner.

U.S. Cl. X.R.

25—76